Nov. 15, 1949   C. JOHNSON   2,487,876
SEPARATOR TRAP
Filed April 12, 1946

*INVENTOR.*
CLARENCE JOHNSON
BY
Raymond W. Junkins
*ATTORNEY*

Patented Nov. 15, 1949

2,487,876

UNITED STATES PATENT OFFICE 2,487,876

SEPARATOR TRAP

Clarence Johnson, South Euclid, Ohio, assignor to Bailey Meter Company, a corporation of Delaware Application April 12, 1946, Serial No. 661,591

2 Claims. (Cl. 183—42)

This invention relates to separators, and more particularly to separators which are adapted especially for use in separating a gaseous fluid from a liquid.

It is a customary practice in the analyzing of gases, such as fuel gases and flue gases, to mix with the gas sample to be analyzed a liquid, such as water, for washing all foreign material from the gas before it is introduced into an analyzing apparatus. After the gas and water have been thoroughly mixed, the mixture is discharged to a separator where the gas is separated from the water which carries with it all foreign material introduced with the gas.

The separator may desirably include a casing having discharge ports at its upper and lower ends, and containing a float which is operatively connected to a valve member for controlling the escape of fluid through the lower discharge port. Passage means may be provided in the upper portion of the casing for introducing into the interior of the latter the mixture of gas and water. The gas separated from the water escapes through the upper discharge port, and the water collects in the bottom of the casing until the float rises and effects an opening of the valve member to drain away the water. If nothing more than this were provided, however, and the escape of gas from the upper port was restricted in some way, a pressure would build up in the casing and act on the float, preventing a raising of the latter to unseat the valve member. Water would then collect in the casing until it flowed through the upper discharge port to the passage means leading to the analyzing apparatus. To prevent such inadvertent flooding of the casing, it is necessary that there be provided some means which is responsive to the pressures in the casing and is operative at a predetermined pressure to unseat the valve member.

An object of my invention is to provide an improved separator. Another object is to provide an improved separator adapted especially for use in separating a gaseous fluid from a liquid. Still another object is to provide a separator having improved pressure actuated valve means for controlling the escape of fluid therefrom. Yet another object is to provide in an improved separator a valve member for controlling the escape of fluid therefrom, and a plurality of fluid actuated means for controlling said valve member. Other objects will appear in the course of the following description.

In the accompanying drawing there is shown for purposes of illustration one form which my invention may assume in practice.

Figure 1:
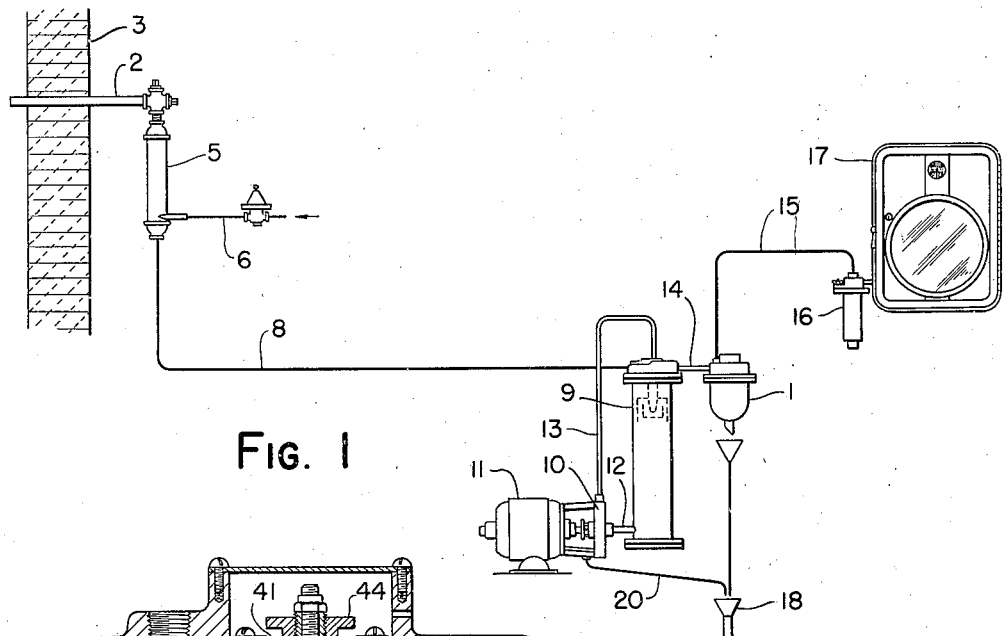
Fig. 1 is a diagrammatic illustration of a gas analyzing system in which my improved separator is incorporated.

I have shown in Fig. 1 my improved separator 1 connected into a system which is adapted for use in analyzing the gaseous products produced by combustion in a furnace. In this system, a conduit 2 extends through the wall 3 of a furnace into the path of combustion products where it picks up gaseous products and then delivers them to a cylindrical shaped member 5. Water is supplied through a conduit 6 to the cylindrical member where it partially mixes with the gases and then flows with the latter through a conduit 8 to an aspirator, generally designated 9, which is similar to the aspirator shown and described in Patent No. 2,356,845, issued to R. B. Hines on August 29, 1944. A pump 10 driven by a suitable power unit, shown herein as an electric motor 11, has its intake and discharge connected by conduits 12 and 13, respectively, to the lower and upper ends of the aspirator. The pump causes the gas and water to be circulated through the aspirator so as to produce a more thorough mixing of the two and to produce a suction in the conduit 8 so as to effect a drawing of gas into the cylinder 5. Foreign material, such as dust, is pulled in with the gas, and the water supplied through the conduit 6 operates to wash the dust through the conduit 8 and prevent a clogging of the latter. When the aspirator 9 becomes filled with the mixture of gas, water and dust, the mixture overflows through a conduit 14 to the separator 1 where the gas is separated from the mixture and then conducted through a conduit 15 and a filter 16 to an analyzing apparatus 17. The water carrying the dust or other foreign material is discharged from the bottom of the separator to a drain funnel 18. A conduit 20 is shown carrying to the drain funnel any water leaking from the pump 10.

Figure 2:
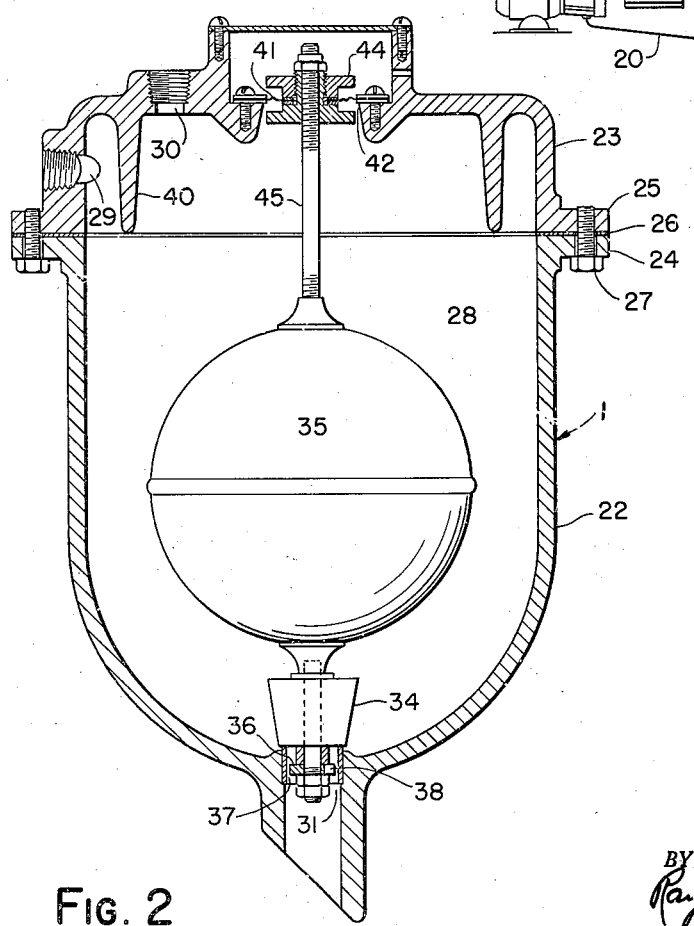
Fig. 2 is an enlarged vertical sectional view of my improved separator.

Referring to Fig. 2 it will be noted that my improved separator 1 comprises casing members 22 and 23 having abutting flange portions 24 and 25 which clamp between them a sealing ring 26. The casing members are connected together by any suitable means, such as screws 27 extending through the flange portions, and cooperate to form a cylindrical chamber 28. Opening through the side wall of the casing member 23 tangentially to its inner periphery is an intake port 29 through which the mixture of fluids passes from the conduit 14 to the chamber 28. The mixture passes circumferentially about the inner walls of the casing, and the water and foreign material are held by centrifugal action close to the casing walls while the gas separates from the mixture and passes toward the central portion of the chamber. Formed in the upper and lower ends of the casing are ports 30 and 31 through which the gas and liquid are respectively discharged, the port 30 communicating with the conduit 15 in the system shown in Fig. 1, and the port 31 opening to the drain funnel 18. A valve member 34 cooperates with the port 31 for controlling the discharge of liquid, and a float 35 is connected to the valve member for unseating the latter when the liquid in the casing reaches a predetermined level. Fixed to the lower end of the valve member is a guide element 36 which cooperates with the sides of the port 31 for guiding the valve member during its opening and closing movements. When the valve member is unseated, fluid escapes to the port 31 through a clearance 37 surrounding the guide element and through one or more openings or notches 38 in the guide element.

As the water swirls about in the chamber 28 it passes to the lower end of the latter and collects until the level of the liquid reaches a point where it raises the float and opens the valve member. The gas separating from the water tends to move upwardly and escape through the port 30. In order that the gas may be separated more completely from the water before gaining admission to the port 30, there is provided an annular flange portion 40 projecting downwardly from the upper end of the casing member 23 between the ports 29 and 30. It will be seen that the gas must pass below the flange 40 before it can get to the port 30, and, because of a change in direction of flow and increased distance of travel, makes for a more complete separation of gas and water.

If there were nothing more than this provided it will be seen that any pressure in the casing would act on the float over an area equal to the area of the port 31 to hold the float in a position with the valve member 34 closed. If something happened so that the flow of gas through the port 30 was restricted, a pressure might be built up in the chamber 28 great enough to prevent the float from raising and opening the port 31. The casing would then fill with water and overflow through the port 30 to the conduit 15 leading to the analyzing apparatus in the system of Fig. 1.

To assure unseating of the valve member 34 when the pressure in the chamber 28 becomes excessive, there is provided a diaphragm 41 connected across an opening 42 in the casing member 23 and carrying a member 44 which is connected to a rod 45 fixed to the upper end of the float. As shown in Fig. 1 the outer side of the diaphragm 41 is exposed to the atmosphere. The area of the opening 42 is somewhat greater than the area of the port 31 so that pressure in chamber 28 tends to actuate the diaphragm 41 and lift the valve 34. The weight of the valve member, float, rod 45 and other connected parts is such that the valve is normally held seated until enough water collects in the lower end of the casing to produce a lifting action on the float.

When the pressure in the separator becomes excessive, the pressure acting on the diaphragm combined with the lifting action on the float produced by the liquid operates to effect an unseating of the valve 34 and permit the fluid to escape through the port 31 before the water can reach the level of the port 30.

While there is shown in this application one form which my invention may assume in practice, it will be understood that this form is shown merely for purposes of illustration and that my invention may be modified and embodied in various other forms without departing from its spirit or the scope of the appended claims.

What I claim as new, and desire to secure by Letters Patent of the United States, is:

1. A gas and liquid separator comprising, in combination, a cylindrical casing having a tangentially directed intake port adjacent one end for introducing a mixture of liquid and gaseous fluids, an annular flange extending into the casing from said one end in spaced relation to the side wall of the casing and to a point below the intake port, an outlet port at said one end positioned inwardly of the flange for discharging gaseous fluid, a liquid discharge port disposed centrally of the other end of the casing; a valve member controlling the liquid discharge port; a float within the casing positively connected with the valve member; and a flexible diaphragm mounted in said one end of the casing and positively connected to said float member, the innerside of the diaphragm being exposed to gaseous pressure within the casing and the outerside of said diaphragm being exposed to the atmosphere.

2. A gas and liquid separator comprising, in combination, a cylindrical casing; a detachably secured end casing member having a tangentially directed intake port at one side thereof for introducing a mixture of liquid and gaseous fluids, an integral annular flange depending inwardly therefrom in spaced relation with and to a point below the intake port, and an outlet port positioned inwardly of the flange for discharging gaseous fluid, said cylindrical casing having a closed end with a liquid discharge port disposed centrally thereof; a valve member controlling said liquid discharge port; a float within the casing positively connected with said valve member; and a flexible diaphragm mounted in an opening in the outer portion of said end casing member and positively connected to said float member, the innerside of the diaphragm being exposed to gaseous pressure within the casing and the outerside of said diaphragm being exposed to the atmosphere, and the area of the diaphragm opening being greater than that of said liquid discharge port.

CLARENCE JOHNSON.

REFERENCES CITED

The following references are of record in the file of this patent:

UNITED STATES PATENTS

| Number | Name | Date |
| --- | --- | --- |
| 548,458 | Reynolds | Oct. 22, 1895 |
| 1,784,664 | Eickholt | Dec. 9, 1930 |
| 2,058,189 | Stuard | Oct. 20, 1936 |

FOREIGN PATENTS

| Number | Country | Date |
| --- | --- | --- |
| 21,594 | The Netherlands | Feb. 16, 1930 |